United States Patent [19]
Lachowicz et al.

[11] 3,843,693
[45] Oct. 22, 1974

[54] NOVEL OXIRANES AND THEIR PREPARATION

[75] Inventors: Donald R. Lachowicz; Kenneth L. Kreuz, both of Fishkill, N.Y.

[73] Assignee: Texaco, Inc., New York, N.Y.

[22] Filed: Oct. 3, 1973

[21] Appl. No.: 402,936

Related U.S. Application Data

[63] Continuation-in-part of Ser. No. 828,774, May 28, 1969, abandoned.

[52] U.S. Cl. .......................... 260/348 R, 260/632 R
[51] Int. Cl. .......................... C07d 1/02, C07d 1/00
[58] Field of Search ................................ 260/348 R

*Primary Examiner*—Norma S. Milestone
*Attorney, Agent, or Firm*—T. H. Whaley; C. G. Ries

[57] ABSTRACT

This invention relates to geminal nitrooxiranes prepared by treating vicinal nitroalkyl peroxy nitrates with strongly alkaline reagents.

15 Claims, No Drawings

NOVEL OXIRANES AND THEIR PREPARATION

This application is a continuation-in-part of Ser. No. 828,774, filed in the U.S. Pat. Office May 28, 1969 and now abandoned.

This invention relates to novel geminal nitroalkyloxiranes and their preparation.

More particularly, this invention concerns the conversion of vicinal nitroalkyl peroxynitrates to geminal nitroalkyloxiranes using certain strongly alkaline reagents. The geminal nitroalkyloxiranes are useful as intermediates in making analogues of acrolein, as curing agents for amino containing polymers, but more importantly as intermediates for preparing alkanols and their ethoxylates, the latter having surfactant properties.

The preparation of nitroalkyl peroxynitrates are described in U.S. Pat. No. 3,282,983. The compounds are prepared by the nitrooxidation of an alkene with dinitrogen tetroxide and oxygen. The reaction sequence is shown below:

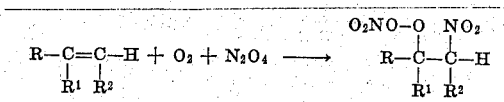

wherein R, $R^1$ and $R^2$ are hydrogen or alkyl, with the proviso that at any given time, either R or $R^1$ are alkyl radicals preferable containing 1 to 18 carbon atoms.

Heretofore the nitroalkyl peroxynitrates have primarily been of interest as intermediates to prepare nitroalkyl nitrates and β-nitro ketones. In order to extend the usefulness of the "peroxy" nitrates considerable effort has been expended to convert the relatively labile peroxy group to more stable functional groups. As a consequence of this work, a unique method has been found to convert the nitroalkyl peroxy compounds into a novel class of more useful compounds. These compounds possess both a nitro group and an epoxy (oxirane) group on the same (geminal) carbon atoms.

Thus, it is an object of this invention to provide a novel class of compounds possessing both an oxirane (epoxy) and nitro functionality on the same carbon atom.

It is another object of this invention to provide a novel and direct process for converting nitroalkyl peroxynitrate compounds to geminal nitroalkyloxiranes in good yield and substantially free from impurities.

Additional objects will suggest themselves to those skilled in the art after a perusal of this application.

It has been found that the above objects among others can be achieved by the process shown below:

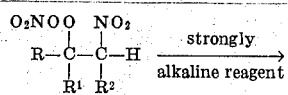

wherein R, $R^1$ and $R^2$ have the definitions previously given to them.

In practice, the nitroalkyl peroxynitrate starting material is treated with a strongly alkaline reagent at relatively low temperatures until the geminal nitroalkyloxirane product is formed. The product can be separated from the reaction mixture and can be further purified by the usual purification techniques of the art, or alternatively used in the form of the reaction mixture.

In the preferred practice, nitroalkyl peroxynitrates in the presence of non-aqueous solvents such as liquid hydrocarbon are contacted at atmospheric pressure at temperatures ranging from about −80°C. to about +40°C., with at least a molar excess of strongly alkaline reagent such as alkali metal hydroxide, quaternary ammonium hydroxide, alkali metal alcoholate or anhydrous ammonia, until substantially all of the vicinal starting material are converted to the geminal nitroepoxy alkanes (nitroalkyloxiranes). The solvent is filtered off and stripped under vacuum to yield the product. Further purification can be effected by crystallization, chromatography, etc.

To aid the reader in the understanding of the inventive process the following amplified description is submitted:

A. Vicinal Nitroalkyl peroxynitrate compounds — These compounds which are the starting materials for the inventive process must contain a peroxynitrate ($O_2NOO-$) group and a nitro ($-NO_2$) group on adjacent carbon atoms. The aliphatic portion of the molecule can contain as few as 4 or as many as 50 carbon atoms or more, preferably from 4 to 20 carbon atoms. Illustrative starting materials include 1-nitro-2-hexyl peroxynitrate, 4-nitro-5-nonyl peroxynitrate, 5-nitro-4-nonyl peroxynitrate, 1-nitro-2-dodecyl peroxynitrate, 7-nitro-8-pentadecyl peroxynitrate, 8-nitro-7-pentadecyl peroxynitrate, 1-nitro-2-octadecyl peroxynitrate, 3-nitro-4-eicosyl peroxynitrate, 4-nitro-3-eicosyl peroxynitrate, 1-nitro-2-eicosyl peroxynitrate, and their mixtures, among others.

B. Strongly alkaline reagent. These reagents include those basic substances which have relatively high $pK_B$ values in either aqueous or non-aqueous systems. For example, the alkali metal hydroxides such as sodium hydroxide and potassium hydroxide can be employed in an aqueous environment, while ammonia and the alkali metal alkoxides (or alcoholates) can be employed in anhydrous or non-protonic media. The lower alkyl quaternary ammonium hydroxides can be employed in aqueous of non-protonic media. The concentration of the alkaline reagents is not critical and can range from 1.0 molar to 10 molar or higher as long as the molar ratio of alkaline reagent to starting material is 1:1 or greater. Basic reagents which do not give favorable results are aqueous solutions of $Na_2CO_3$, $NaHCO_3$ and aqueous ammonia. The alkali metal hydroxides are preferred in aqueous systems and ammonia in anhydrous systems.

C. Ratio of strongly alkaline reagent to vicinal nitroalkyl peroxy starting material.

A minimum of 1 mole of the "base" (strongly alkaline reagent) per mole of nitroalkyl peroxy starting material should be used and molar ratios up to 10:1 or higher can be employed without adversely effecting yields or purity. However, inasmuch as no particular benefits are obtained where higher ratios of base are employed, economics dictate the use of ratios of base to nitroalkyl peroxy ranging from about 1:1 to 5:1.

D. Reaction Temperatures and Pressures — The reaction temperatures can vary considerably depending upon whether an aqueous or non-aqueous medium is employed. In non-aqueous media where the low freezing points of solvents such as the ethers permit it, reaction temperatures ranging from about −80°C. and lower to about +40°C. can be employed with good results. Lower reaction temperatures unduly increase reaction times, are inconvenient to maintain and appear to offer no apparent advantages. Temperatures appreciably above 40°C. give rise to substantial decomposition of the nitroalkyl peroxy compounds and favor undesirable competing reactions. In aqueous media, the freezing point of the alkaline solution limits the reaction temperatures from several degrees below zero to the 40°C. level. The preferred range for reactions run in either aqueous or non-aqueous media is from just above 0°C. to about 30°C.

Superatmospheric pressures can be utilized if desired but do not appear to significantly increase yields. On the other hand, the use of superatmospheric pressures increases operating hazards and requires more costly and specialized equipment. For these reasons atmospheric or near atmospheric pressures are preferred while operating the inventive process.

E. Solvent environment — As indicated supra, the inventive process can be run in either aqueous or non-aqueous media. When inorganic alkaline reagents such as potassium or sodium hydroxide are used it is convenient to use them in the form of their aqueous solutions or as mixtures of the base in water and water miscible non-protonic solvents. When ammonia or an organic base is used, it is convenient to dissolve the ammonia or base in inert solvent such as the lower dialkyl ethers, and to add the nitroalkyl peroxynitrate to the inert solvent solution containing the organic base or ammonia. The nitroalkyl peroxynitrate starting material can be used in relatively pure form free from solvents or in the form of the relatively crude reaction mixtures derived from the earlier preparative nitrooxidation. In the latter case, the nitroalkyl peroxynitrate can contain substantial quantities of inert organic solvent such as the alkanes. Apparently, the presence of the inert, water immiscible, organic solvent does not adversely effect yields even when the base is in an inorganic medium.

In order to present the inventive process in the greatest possible detail, the following illustrative preparations are submitted.

EMBODIMENT A. PREPARATION OF 1-NITRO-2-DODECYLPEROXY NITRATE STARTING MATERIAL

Using the procedure described in U.S. Pat. No. 3,282,983, 0.068 mole of 1-dodecene in 120 ml. of n-hexane is added to a reaction vessel equipped with a thermometer, reflux condenser, gas inlet tube and stirring and heating means and chilled to 0° to 5°C. Oxygen is passed through a flowmeter as a rate of 56.5 ml./minute and conducted over dinitrogen tetroxide and then into the 1-dodecene solution until all of the dinitrogen tetroxide is conducted into the reaction vessel over a period of 4 hours. At the end of this time, solvent and excess dinitrogen tetroxide are evaporated off under vacuum and the product is identified by infrared and nuclear magnetic resonance spectroscopy to be the desired 1-nitro-2-dodecyl peroxynitrate starting material.

Example 1. Preparation of 1-Nitro-1,2-Epoxydodecane Using Aqueous Sodium Hydroxide.

To a conveniently sized reaction vessel equipped with heating, cooling and stirring means is added 150 ml. of 1.0 normal aqueous solution of sodium hydroxide. The aqueous alkaline solution is cooled with stirring to 0°–5°C. and the solution is maintained at this temperature throughout the subsequent reaction. A preparation of 1-nitro-2-dodecyl peroxynitrate which was prepared in Embodiment A is added dropwise to the chilled stirred alkaline solution within a 5 minute period. At the end of this time the reaction mixture is extracted 3 times with 40 ml. portions of diethyl ether and 13 g. of a solid product is obtained after evaporation of the ether. Nuclear magnetic resonance and infrared data confirms that the desired 1-nitro-1,2-epoxydodecane product is prepared.

Example 2. Preparation of 1-Nitro-1,2-Epoxydodecane Using Anhydrous Ammonia.

A preparation of 1-nitro-2-dodecylperoxy nitrate prepared from 0.023 mole of 1-dodecene and excess dinitrogen tetroxide as described in Embodiment A is added to a reaction vessel containing a stirred mixture of 150 ml. of diethyl ether and 0.23 mole of ammonia and maintained at −73°C. After stirring for 15 minutes at −73° to −79°C., the reaction mixture is evaporated to half its volume while warming to room temperature to remove excess ammonia. A precipitate of ammonium nitrate is filtered off and the diethyl ether solution containing the product is stripped off under vacuum leaving an oil. The oil is taken up in 50 ml. of methylene chloride and washed 3 times with 15 ml. portions of water. The methylene chloride is dried and stripped off under vacuum to yield 4 g. of an oxirane product which is shown to be identical to the product of Example 1, by infrared analysis and nuclear magnetic resonance spectral analysis.

Example 3. Preparation of 1-Nitro-1,2-Epoxyhexane.

A preparation of 1-nitro-2-hexyl peroxynitrate prepared from 0.033 mole of 1-hexene and excess dinitrogen tetroxide as described in Embodiment A is added to a reaction vessel containing a stirred mixture of 300 ml. of diethyl ether and 0.26 mole of ammonia and maintained at −70°C. After stirring at this temperature for 15 minutes, the reaction mixture is evaporated to half its volume while warming to room temperature to remove excess ammonia. The precipitate of ammonium nitrate is separated and the diethyl ether extract is stripped off under vacuum leaving a residual oil which weighs 3.26 g. A 0.50 g. sample of the residual oil is taken up in 50 ml. of methylene chloride and washed 3 times with 15 ml. portions of water. The methylene chloride is dried and stripped off under vacuum to yield a product which infrared analysis and nuclear magnetic resonance spectra confirm to be the expected 1-nitro-1,2-epoxyhexane product.

Example 4. Preparation of 1-Nitro-1,2-Epoxyoctadecane.

A preparation of 1-nitro-2-octadecyl peroxynitrate is prepared from 0.01 mole of 1-octadecene and excess dinitrogen tetroxide using the procedure described in Embodiment A. The solid product, kept at about 0°C., is treated with 100 ml of aqueous 1.0 N sodium hydroxide solution and the stirred reaction mixture is allowed to warm up to 14°C. over a period of 20 minutes. At this time the product is taken up with 150 ml of diethyl ether and the ether layer is separated and dried over anhydrous sodium sulfate. After filtering off the drying agent, the ether layer is stripped under vacuum to yield a low melting solid. A sample of this solid is recrystallized from pentane to yield a product melting at 45°–47°C. which infrared analysis and nuclear magnetic resonance spectra confirm to be the expected 1-nitro-1,2-epoxyoctadecane. Example 5. Preparation of 1-Dodecanol.

A solution of 2.3 g. (0.01 mole) of 1-nitro-1,2-epoxydodecane (prepared as in Example 1) in 10 ml of diethyl ether is added dropwise over a 10 minute period to a stirred slurry of 0.76 g. (0.02 mole) of lithium aluminum hydride in 50 ml of diethyl ether maintained at 20°–30°C. The reaction mixture is stirred for an additional 1 hour. A small amount of water is slowly added and the mixture is poured into ice to destroy unreacted lithium aluminum hydride. Sufficient concentrated aqueous NaOH solution is added to dissolve the aluminum compounds and the mixture is extracted with diethyl ether. A liquid product is isolated from the ether solution after drying by stripping the solvent. A portion of the product when purified yields a low-melting solid which infrared and NMR analyses and melting point confirm to be 1-dodecanol.

Example 6. Preparation of 1-Octadecanol.

Using the procedure of Example 5, 3.1 g. (0.01 mole) of 1-nitro-1,2-epoxyoctadecane (prepared as in Example 4) is reduced in diethyl ether using 0.02 mole of lithium aluminum hydride at 30°–35°C. The reaction is terminated after a 3-hour period and a portion of the reaction mixture is purified for characterization. Infrared and NMR analyses and melting point confirm that the product is 1-octadecanol.

Example 7. Preparation of 1-Hexanol.

The procedure of Example 5 is used to reduce 1.45 g. (0.01 mole) of 1-nitro-1,2-epoxyhexane (prepared as in Example 3) in diethyl ether at 20°–30°C using 0.02 mole of lithium aluminum hydride. After purification, infrared and NMR spectra and refractive index indicate that the liquid product is 1-hexanol.

As can be readily seen, the above alkanol products are useful and well known products which are useful per se or can be oxidized to the corresponding alkanoic acids, esterified or ethoxylated to product products having surfactant properties.

Example 8. Ethoxylation of the Products of Examples 5, 6 and 7.

A. To a reaction vessel equipped with heating, cooling and stirring means, and means of passing ethylene oxide into the vessel, is added 100 parts by weight of purified 1-dodecanol prepared in Example 5 and 1 part by weight sodium metal. Ethylene oxide (10 moles per mole of 1-dodecanol) is introduced into the mixture over a 6-hour period while maintaining the reaction temperature between 95°–125°C. After acidification, cooling and filtration, the product is found to contain an average of about 9 moles of ethylene oxide per mole of 1-dodecanol.

B. The same procedure is followed with the purified 1-octadecanol prepared in Example 6 except that an average of about 12 moles of ethylene oxide are introduced per mole of 1-octadecanol in the reaction mixture.

C. In the same vein an average of about 6 moles of ethylene oxide are introduced into the reaction mixture per mole of 1-hexanol (prepared as in Example 7)

Samples of the A, B and C products evaluated in the STANDARD FOAN Test (ASTM procedure No. D1173-53 demonstrate desirable foaming properties in aqueous solution, and are useful as surfactants.

As the preceding discussion, embodiments and examples have indicated, this invention offers several significant advantages in both its process and product aspects. For example, in its process aspects the inventive process offers the advantages of a direct preparative procedure for preparing novel nitro epoxy compositions, under mild conditions, in good yield in a relatively pure state. Further, the conversions are effected using any of several different strongly alkaline reagents in either an aqueous or non-aqueous reaction environment.

In its product aspects, this invention provides a heretofore unreported class of reactive compounds having two different functional groups (nitro and epoxy) on the same carbon atom. These products can be used as intermediates for the preparation of alpha, beta, unsaturated ketones as well as analogues of acrolein and acrylic acid.

As described supra and throughout this application, numerous modifications, changes and substitutions can be made in the inventive process without departing from the invention concept. The metes and bounds of this invention are best gleaned from the claims which follow, taken in conjunction with the specification.

What is claimed is:

1. The method of preparing geminal nitroalkyloxiranes included within the formula:

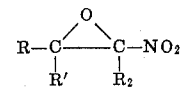

wherein R, R' and $R^2$ are selected from the group consisting of hydrogen and alkyl, comprising treating a vicinal nitroalkyl peroxynitrate included within the formula:

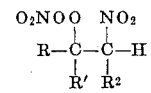

wherein R, R' and $R^2$ are selected from the group consisting of hydrogen and alkyl radicals, with the proviso that at any given time, either R or R' are alkyl radicals, with at least a molar equivalent of a strongly alkaline reagent, at reaction temperatures ranging up to about +40°C., until said geminal nitroalkyloxiranes are formed.

2. The method of claim 1 wherein the reaction temperature ranges between about −80°C. to about +40°C., and the reaction is conducted in a non-aqueous environment.

3. The method of claim 1 wherein the reaction temperature ranges between about 0° to about +40°C. and the reaction is conducted in an aqueous environment.

4. A method of claim 1 wherein the vicinal nitroalkyl peroxynitrate contains from 4 to 50 carbon atoms.

5. The method of preparing geminal nitroalkyloxiranes containing 4 to 20 carbon atoms included within the formula:

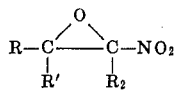

wherein R, R' and R² are selected from the group consisting of hydrogen and alkyl radicals containing from 1 to 18 carbon atoms with the proviso that at any given time either R or R' are alkyl radicals, comprising treating a vicinal nitroalkyl peroxynitrate containing from 4 to 20 carbon atoms, said peroxynitrates being included within the formula:

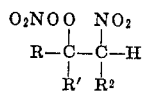

wherein R, R' and R² are as defined above, with from 1 to 10 moles of strongly alkaline reagent in a solvent environment, at reaction temperatures ranging up to about 40°C., until said geminal oxiranes are formed.

6. The method of claim 5 wherein the strongly alkaline reagent is selected from the group consisting of the alkali metal hydroxides, alkali metal alkoxides, lower quanternary ammonium hydroxides and ammonia.

7. The method of claim 5 wherein the reaction is conducted in an aqueous solvent environment at temperatures between about 0° and about 30°C. and the strongly alkaline reagent is an alkali metal hydroxide.

8. The method of claim 5 wherein the reaction is conducted in a non-aqueous solvent environment at temperatures between about −80° to +40°C. and the strongly alkaline reagent is selected from the group consisting of ammonia and lower alkyl quaternary ammonium hydroxides.

9. The method of claim 5 wherein the geminal nitroalkyloxirane is 1-nitro-1,2-epoxydodecane.

10. The method of claim 5 wherein the geminal aliphatic nitrooxirane is 1-nitro-1,2-epoxyhexane.

11. The method of claim 5 wherein the geminal aliphatic nitrooxirane is 1-nitro-1,2-epoxyoctadecane.

12. 1-Nitro-1,2-epoxyalkanes wherein the alkane moiety contains from 4 to 20 carbon atoms.

13. 1-Nitro-1,2-epoxyhexane.

14. 1-Nitro-1,2-epoxydodecane.

15. 1-Nitro-1,2-epoxyoctadecane.

* * * * *